Jan. 5, 1965   B. W. SPEAR ETAL   3,164,672
CONTROLLING IMPLOSIONS IN CATHODE-RAY AND OTHER TUBES
Filed Oct. 14, 1960   2 Sheets-Sheet 2

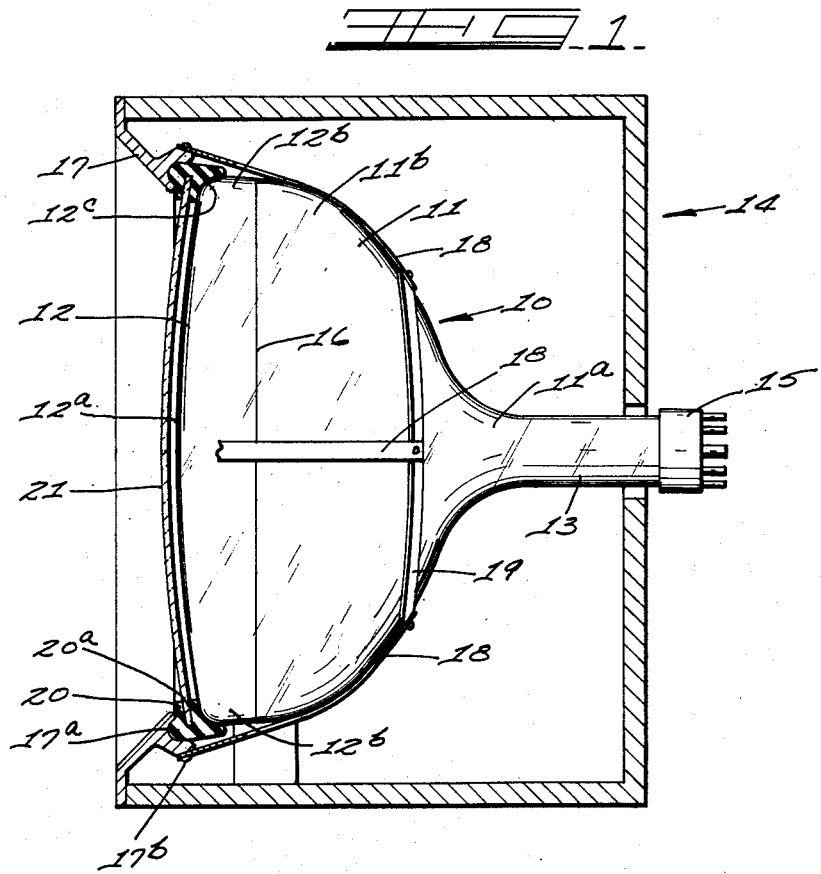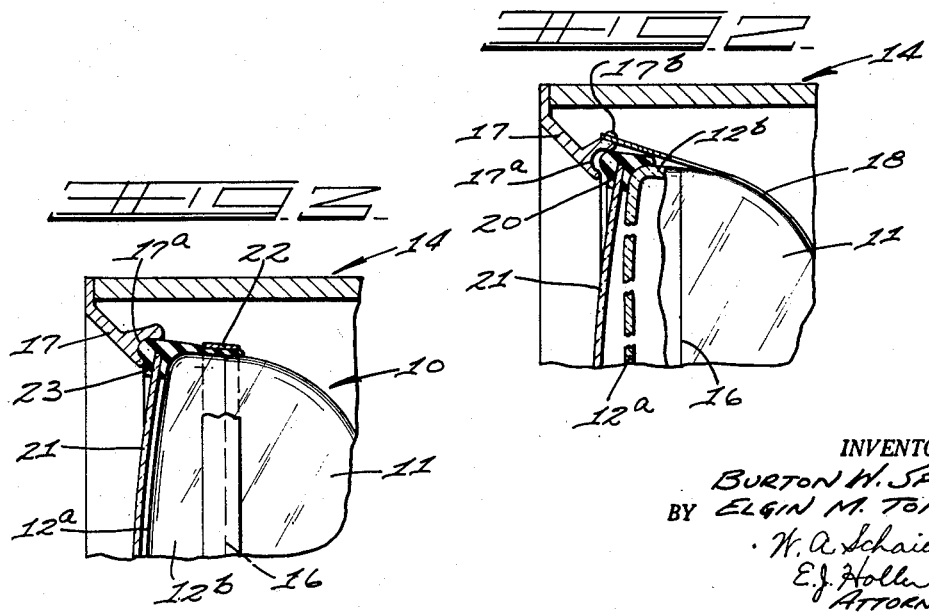

INVENTOR.
BURTON W. SPEAR
BY ELGIN M. TOM
W. A. Schaich &
E. J. Holler
ATTORNEYS

United States Patent Office 3,164,672
Patented Jan. 5, 1965

3,164,672
CONTROLLING IMPLOSIONS IN CATHODE-RAY AND OTHER TUBES
Burton W. Spear and Elgin M. Tom, Toledo, Ohio, assignors, by mesne assignments, to Owens-Illinois Glass Company, Toledo, Ohio, a corporation of Ohio
Filed Oct. 14, 1960, Ser. No. 62,786
4 Claims. (Cl. 178—7.82)

This invention relates to the prevention and containment of implosions of sealed and evacuated glass cathode-ray picture tubes for television reception or other types of sealed tubes or articles and more particularly to the accomplishment of these and other desirable end results by the prescribed method and mounting arrangement of such tubes.

In the present invention the theory of controlling implosion and accompanying explosion of vacuumized tubes is contemplated as especially applicable to incorporation into cathode-ray tube display equipment such as television receivers.

During the manufacture and assembly of television picture tubes having envelopes comprised principally of glass a point is reached where the tube envelopes are evacuated to a high degree of vacuum which produces high surface stresses due to atmospheric loading over their entire surface areas. The tube envelopes being fabricated of glass possess certain degrees of frangibility which can become increased due to processing and under evacuation and thus they potentially possess inherent destructive power. It is readily apparent that upon fracture and the resultant implosion-explosion when the high pressure is suddenly released and converted into a driving force behind the fragments of broken glass substantial velocities can be imparted to such fragments. It has been observed that fragments from such implosion-explosion may travel over a range from 20–25 feet or greater and must be contained especially in a forward direction to prevent damage or injury.

In present practice a hermetically sealed cathode-ray picture tube envelope having a generally frusto-conical or frusto-pyramidal shape is fabricated from composite hollow glass parts having relatively smooth outwardly-convex sidewalls. The tube envelope is formed by sealing an extensive glass face plate to a dome-shaped glass funnel having complemental sealing surfaces which envelope is subject when evacuated to considerable forces particularly on the face plate, funnel and seal area therebetween. The seal area is conventionally disposed at a region of the envelope of maximum cross-sectional dimensions and must be capable of a withstanding considerable stress both during processing and handling subsequent to envelope fabrication as well as when the completed tube is placed in service. In frusto-pyramidal tubes having a rectangular viewing panel whose length-to-width ratio is approximately 4:3, the corner areas frequently exhibit diminished stresses while the interconnecting flattened sides may be stressed in tension in a pattern normal to the tube axis. This area in rectangular tubes may be markedly conducive to breakage and must be properly reinforced or strengthened particularly in tube envelopes having more nearly square corners at their image display region. Such shapes are employed in the recently developed 19 and 23 diagonal inch 114° beam angle picture tubes referred to as "wide-screen" or "square-look" tubes.

Prior art methods of providing fracture restraint in cathode-ray tube envelopes comprised essentially of glass have included adhering or attaching a restraining band of metal or plastic material to the envelope at areas of greatest cross-sectional dimensions to introduce compressive forces into the underlying glass. The added compression in the tube sidewalls serves to control the propagation and direction of fissures or fractures which when uncontrolled can result in violent implosion-explosion of the envelope. Such methods and resultant articles are disclosed in Patent Nos. 2,785,820 issued to Vincent and Logue on March 19, 1957, and 2,874,017 issued to Henry and Vincent on February 17, 1959, both patents being assigned to the same parent assignee as the present application. The subject matter of these patents is particularly advantageous for application to the manufacture and processing of cathode-ray picture tubes "per se," however, the unit cost of manufacturing each tube is increased.

The present invention is primarily concerned with conventional cathode-ray picture tubes or other vacuumized articles and controlling destructive implosion-explosion of the tube envelope while in working arrangement such as when properly mounted within a television receiver cabinet. Heretofore, it has been common practice to position a flat plate of tempered glass in a rigid mounting adjacent the viewing portion of the picture tube each normally being retained separately. The light-transmitting flat plate must have sufficient strength to serve as an implosion-resistant panel before the image display portion of the tube. More recently, manufacturers of receiving sets have employed a curved light-transmitting protective panel adjacent the tube viewing screen to minimize space requirements of the set. However, it has remained conventional procedure to retain the periphery of the plate or panel in a stationary fixed mounting independently of the picture tube. Therefore, it has been imperative that the panel have appreciable strength and toughness sufficient to withstand breakage to thus control the violent effects of implosion-explosion of the picture tube particularly in a forward direction. On occasion the rigidly-mounted implosion panel is fractured concomitantly with implosion-explosion of the tube envelope permitting glass fragments to fly forwardly in a dangerous manner. This invention overcomes this problem and provides greater protection against this occurrence and a greater measure of safety with implosion panels having minimal thickness.

It has also been contemplated to provide the viewing portion of the picture tube with an integral protective panel or implosion plate permanently affixed to its face plate portion. This construction involves laminating a glass implosion plate to the glass face plate with both members having complemental contours by utilizing a thin layer of solidified resinous material between the juxtaposed glass surfaces. Particular care and considerable expense is involved in fabricating such tube envelope to provide a double-thickness display portion having the required properties of optical clarity and resolution and sufficient strength to resist implosion. The tube envelope carrying an integral implosion plate normally requires additional processing for its fabrication subsequent to completing the installation of the electronic working components of the picture tube. The completed tube has a high unit cost and damage to its integrally-bonded implosion panel or envelope requires replacement of the entire unit.

Accordingly, it is an object of the present invention to control the occurrence of destructive implosion-explosion of an evacuated television picture tube mounted in operative arrangement.

Another object of the present invention is to provide an improved method of controlling destructive implosion-explosion of a sealed evacuated electron-discharge tube by prescribed mounting arrangement of a light-transmitting protective panel contiguous with the rim portion of the tube face plate.

Another object of the present invention is to provide a novel and expedient method of limiting destructive effects due to implosive-explosive breakage of a vacuumized cathode-ray picture tube having a glass envelope by mounting a light-transmitting protective panel of peripherally complemental contour contiguous with the periphery of the tube viewing portion to obtain collapsing of the tube envelope without breakage of the protective panel.

Another object of this invention is to provide improved method and means for controlling destructive effects of implosion-explosion of a sealed evacuated television picture tube on breakage and particularly the newly-developed rectangular tube shapes having more nearly square corners at their viewing area.

A still further object of the present invention is to provide an improved mounting arrangement for supporting a glass protective panel adjacently and coextensively for movement with the peripheral region of the viewing screen of a rectangular picture tube envelope mounted within a receiver cabinet to minimize and prevent the establishment of destructive forces on the panel upon breakage of the envelope.

The specific nature of this invention, as well as other objects and advantages thereof, will become apparent to those skilled in the art from the following detailed description taken in conjunction with the annexed sheet of drawings on which, by way of preferred example only, are illustrated the preferred embodiments of this invention.

On the accompanying drawings:

FIG. 1 illustrates a longitudinal cross-sectional view of a television receiver cabinet in simplified form illustrating a cathode-ray picture tube mounting assembly in accordance with this invention.

FIG. 2 is an enlarged fragmentary vertical sectional view of one portion of FIG. 1 showing the tube face plate periphery at an early stage of implosion-explosion of the tube envelope.

FIG. 3 is an enlarged fragmentary vertical sectional view of a modified form of mounting assembly embodying the invention.

Figure 4:
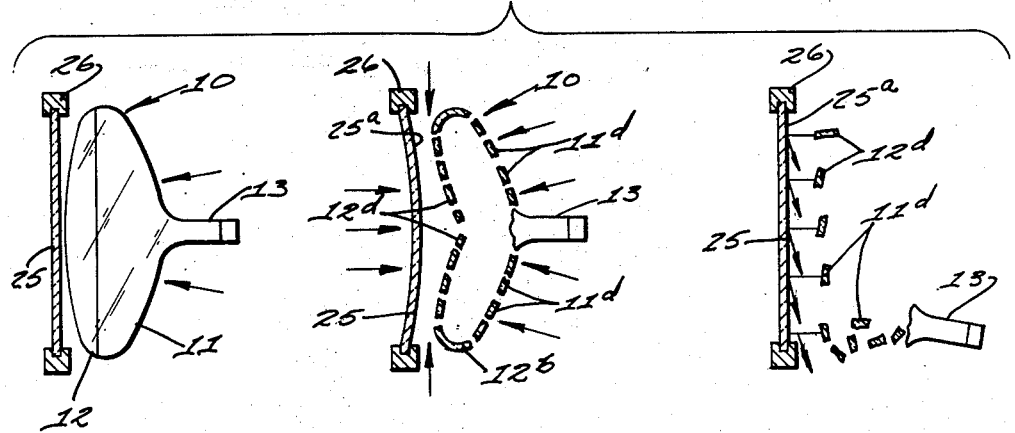
FIG. 4 is a schematic view showing in sequence the effects on a conventionally mounted implosion panel during implosion-explosion of a tube envelope.

While this invention will be described hereinafter as specifically applied to the mounting of a vacuumized cathode-ray picture tube in a television receiver cabinet, it will be readily apparent to those skilled in the art that the principles of the invention are equally applicable to mounting many and various types of evacuated tubes especially those fabricated of glass. Of particular interest in accordance with this invention is the installation and permanent retention of an essentially all-glass envelope of a cathode-ray television picture tube in operative arrangement, the viewing area adjacent the tube display portion being safeguarded against dangerous implosive-explosive effects of the tube envelope.

In a preferred embodiment of the present invention as shown in FIG. 1 a glass cathode-ray picture tube envelope 10 comprised of a funnel 11, hollow glass face plate 12 and neck 13 is shown permanently mounted within a television receiver cabinet 14. The tube neck is normally sealed at its extremity by one or more electron-emitting beam guns 15. Funnel 11 is preferably frusto-pyramidal in shape although it may also be frusto-conical having its small end 11a hermetically sealed to neck 13 and its large end 11b sealed to face plate 12. Face plate 12 consists of a curved viewing panel 12a which may be concavo-convex or curvilinear in shape surrounded by a depending annular side panel or flange 12b. Flange 12b and large funnel end 11b terminate in sealing surfaces of complemental contour which are joined along annular seal line 16 either by direct fusion of the glass, by metal bands fused thereto and joined, or by an interposed layer of low-melting glass sealing composition compatible with thermal expansivity characteristics of the rigid glass parts. Known combinations of the above three methods of sealing can also be employed as desired or the envelope can be comprised of unipiece construction. The overall shape of the envelope 10 at its viewing area of maximum cross-sectional dimensions may be circular or substantially rectangular as conventionally known in the art. Although the invention is equally applicable to both shapes, it is of particular utility for use with rectangular types.

The picture tube comprised essentially of an all-glass envelope 10 in accordance with the present invention is contemplated as being fully completed, sealed and evacuated with all its various internal and external electronic components properly installed in operative alignment to provide television images. Other working components of the television receiver such as the chassis and its component parts and suitable electromagnetic deflection coils for causing electron beams to scan a suitable raster have been eliminated for purposes of clarity and because they do not necessarily pertain to the substance of the present invention.

Cabinet 14 which retains picture tube envelope 10 has one open end or side around which is fitted an escutcheon or bezel member 17. The cabinet consists of rigid hollow body substantially rectangular or prismoidal in form closely surrounding the cathode-ray tube envelope 10.

Bezel member 17 has an internal configuration complemental to the peripheral contour of cathode-ray tube face plate 12. The inner contour of bezel member 17 has essentially the same geometric configuration and slightly lesser dimensions than the corner region 12c formed by the junction of flange portion 12b and viewing panel 12a of the tube face plate. Bezel member 17 preferably has an annular recess 17a in its surface facing interiorly of the cabinet contiguous with face plate corner region 12c. A series of spaced-apart protruding lugs 17b are provided on an adjacent outwardly-projecting surface of the bezel member. Lugs 17b serve to engage and retain the ends of a series of similarly-spaced flexible support straps or bands 18 adapted to at least partially surround and hold the body or funnel portion of tube enevelope in conjunction with an annular band 19. Bands 18 and 19 and lugs 17b of the bezel member in combination form a tube envelope retention assembly.

An annular gasket 20 of resilient material such as synthetic rubber, thermoplastic or other elastomeric composition surrounds the corner region 12c of the face plate. Gasket 20 is preferably molded having contours on opposing sides complemental to annular recess 17a of the bezel member and corner region 12c of the face plate. The complemental contours of the gasket and bezel recess 17a serve to align these members in proper seating arrangement for the face plate periphery. Gasket 20 has an annular inwardly facing recess 20a adapted to receive and retain the perimeter of a light-transmitting protective panel 21. Panel 21 is preferably comprised of tempered glass and has a concavo-convex or curvilinear contour geometrically similar to the external surface of face plate viewing panel 12a. The peripheral region of the protective panel extends coextensively with the corner region 12c of the face plate. As shown in FIGS. 1, 2 and 3 the protective panel has a substantially uniform thickness throughout and the gasket groove or recess 20a surrounds and encompasses its periphery.

In assembling the prescribed components the annular gasket 20 is sufficiently deformable to be stretched to receive the edge of implosion panel 21. The implosion panel held by resilient gasket 20 is then fitted to the corner region of the tube face plate either by friction fit or by a narrow annular band of cement. The forwardly projecting portion of gasket 20 is then fitted into bezel recess 17a in such manner as to be freely separable therefrom. The tube retention harness is then employed to hold the tube envelope 10 is essentially rigid firm engagement with bezel member 17.

FIG. 2 illustrates the mounting arrangement of annular gasket 20 within bezel recess 17a and, more specifically, the manner in which these members are readily separable upon implosion of tube envelope 10. Should face plate panel 12a or funnel 11 for some reason commence to implode inwardly, atmospheric loading on implosion panel 21 forces the panel and its supporting gasket 20 rearwardly conjunctively with face plate flange 12b. The implosion panel is thus conducive to free inward movement toward the center of the tube envelope. The panel being retained by resilient gasket 20 is able to cushion the movement of the implosion panel both inwardly and outwardly as the tube envelope breaks up.

FIG. 3 illustrates a modification of the invention in which an annular rigid band 22 such as a metallic ring is employed exteriorly to retain a skirt portion of a modified form of gasket 23 coextensively with seal line 16. Gasket 23 is generally similar to gasket 20 except it has greater longitudinal extent. In this form of the invention the tube envelope carries implosion panel 21 by gasket 23 secured to the face plate flange portion, the gasket extending over maximum cross-sectional dimensions of the envelope. Annular gasket 23 is mounted within bezel recess 17a so as to be freely separable therefrom as described above. Panel 21 being attached to face plate flange portion 12b moves therewith upon breakage of the envelope.

In FIG. 4 conventional implosion-explosion protection of a cathode-ray picture tube envelope 10 is illustrated. Face plate 12 is disposed closely adjacent a planar implosion panel 25. Implosion panel 25 is retained within a stationary separate rigid mounting 26 in accordance with prior practice. Upon fracture of the evacuated tube envelope and as face plate 12 disintegrates into many fragments 12d, the latter initially move inwardly toward the tube funnel 11 which similarly fractures into many fragments 11d. A decompression zone is temporarily created immediately behind implosion panel 25 causing it to tend to bow inwardly. Thus, its inner surface 25a facing the fragmenting envelope is placed in severe tension for a brief interval due to atmospheric pressure forcing the plate inwardly. With inner surface 25a placed in extreme tension it is highly subject to damage and breakage by fragments 11d and 12d which are forcefully projected forwardly. The pronounced bowing effect of the panel occurs due to its being rigidly retained at its periphery separately of the envelope and the extreme pressure differences which exist on opposite sides thereof. All of the aforesaid conditions normally occur during implosion-explosion within an extremely brief period of time measured in milliseconds.

Panel 25 mounted as shown in FIG. 4 must have considerable strength and thickness to prevent breakage thereof due to forceful impingement of massive glass fragments which are driven thereagainst. We have found in tests conducted to evaluate the various types of implosion panels that massive fragments which comprise a part of the original face plate flange portion 12b can strike peripheral regions of the panel bowed in tension and cause breakage thereof. Obviously upon breakage of panel 25 some of the envelope fragments 11d and 12d are projected forwardly along with panel fragments. When this occurs, the panel cannot serve its protection function of the area forwardly of the tube display region.

Figure 5:
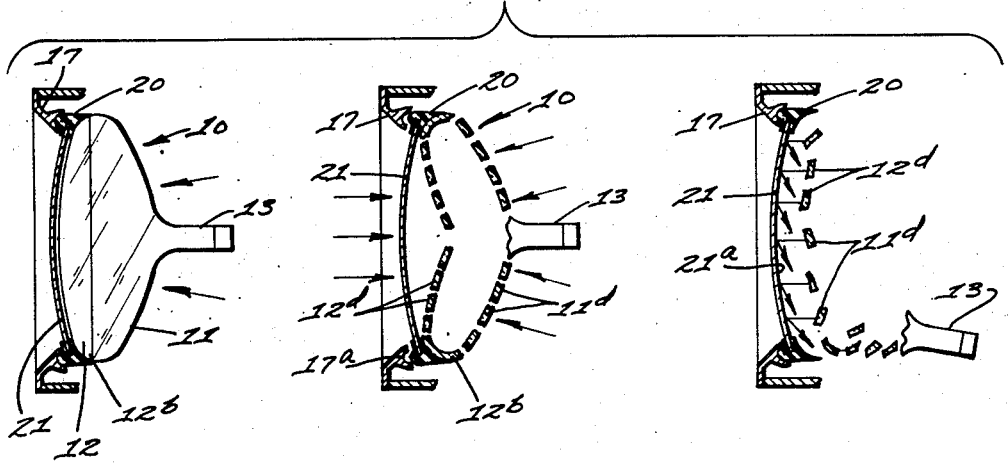
FIG. 5 is a view similar to FIG. 3 showing in sequence of effects on an implosion panel mounted in accordance with the present invention during implosion-explosion of a tube envelope.

As shown in FIG. 5 the tube envelope 10 is mounted in accordance with our invention. Upon implosion of the envelope and as face plate flange 12b moves rearwardly protective panel 21 moves therewith cushioned by annular gasket 20. The gasket separates from the bezel member 17 and is carried inwardly (left-to-right in FIG. 5) a relatively short distance without undue stresses being exerted thereupon. The panel 21 being free to move inwardly precludes the establishment of excessive loading forces on its exterior surface. Upon concomitant explosion fragments 11d and 12d of the envelope impinge upon the inner surface of panel 21 along with the atmosphere rushing into the area formerly occupied by the envelope. Panel 21 is moved outwardly and gasket 20 quickly returns to seat in vertical alignment within bezel recess 17a. The gasket cushions the impact of fragments 11d and 12d striking panel inner surface 21a which is not stressed in tension.

The protective panel being free to move with the portion of the envelope having maximum cross-sectional dimensions permits the use of a thinner panel to obtain the same degree of protection provided by the much thicker panel mounted conventionally in accordance with FIG. 4. Alternatively, the use of a panel having a thickness generally similar to those which are rigidly mounted provides a considerably greater degree of protection against breakage of the panel upon tube implosion-explosion.

Various modifications may be resorted to within the spirit and scope of the appended claims.

We claim:

1. A mounting arrangement for retaining a sealed cathode-ray television picture tube in a receiver cabinet to control destructive implosion-explosion of said tube, said tube having an evacuated envelope fabricated substantially of glass, said envelope having a generally frusto-pyramidal body portion, a substantially rectangular image-forming display portion attached to the larger end of said body portion and a neck portion attached to its smaller end, said mounting arrangement comprising a substantially rectangular bezel member rigidly supported by said cabinet and having an inner configuration generally complemental to the peripheral region of said tube display portion, an annular resilient gasket member interposed essentially fully between said bezel member and a peripheral region of said display portion, a light-transmitting protective panel disposed adjacently and extending coextensively with the said tube display portion having its periphery retained by said gasket member, and means for retaining said gasket member in firm engagement with said bezel member and the peripheral region of said tube display portion, said gasket member being unrestrained by said bezel member when said protective panel is subjected to a disturbing force directed toward the image-forming display portion of said cathode-ray tube.

2. The mounting arrangement for retaining a sealed cathode-ray picture tube in a receiver cabinet in accordance with claim 1, wherein said annular gasket member has frontal surface contours complemental to the contacted surfaces of said bezel member and the peripheral areas of said protective panel and tube display portion, said gasket member being restrained by said bezel member when said protective panel is subjected to an outwardly directed disturbing force.

3. The mounting arrangement for retaining a sealed cathode-ray picture tube in a receiver cabinet in accordance with claim 1, wherein said means for retaining said gasket member in position comprises a harness assembly interconnecting the body portion of said tube and the said bezel member.

4. A mounting arrangement for supporting an evacuated television picture tube in a receiver cabinet to control destructive implosive-explosive effects of an essentially all-glass tube envelope comprising a rigid annular support member having an annular configuration generally complemental to and of slightly lesser dimensions than the periphery of the viewing portion of the said envelope, a light-transmitting protective panel extending coextensively with the viewing portion of said envelope disposed in adjacent relationship thereto, and an annular resilient member surrounding the complemental peripheries of said protective panel and said tube viewing portion to retain the same in aligned relation as an integral unit, and means for retaining said annular resilient member in firm engagement with said rigid support member, said resilient member being unrestrained by said rigid support member when said protective panel is subjected to a disturbing force directed toward the viewing portion of said picture tube.

References Cited in the file of this patent

UNITED STATES PATENTS

| | | |
|---|---|---|
| 2,456,399 | Gethmann | Dec. 14, 1948 |
| 2,559,353 | Fisch | July 3, 1951 |
| 2,936,448 | Marholz | May 10, 1960 |
| 3,084,217 | Fiore et al. | Apr. 2, 1963 |

FOREIGN PATENTS

| | | |
|---|---|---|
| 792,478 | Great Britain | Mar. 26, 1958 |

OTHER REFERENCES

Rider Television Manual, vol. 2, United Motors Service Model TV–71A, pages 10, 11, 17 and 18; copyrighted 1949.